UNITED STATES PATENT OFFICE.

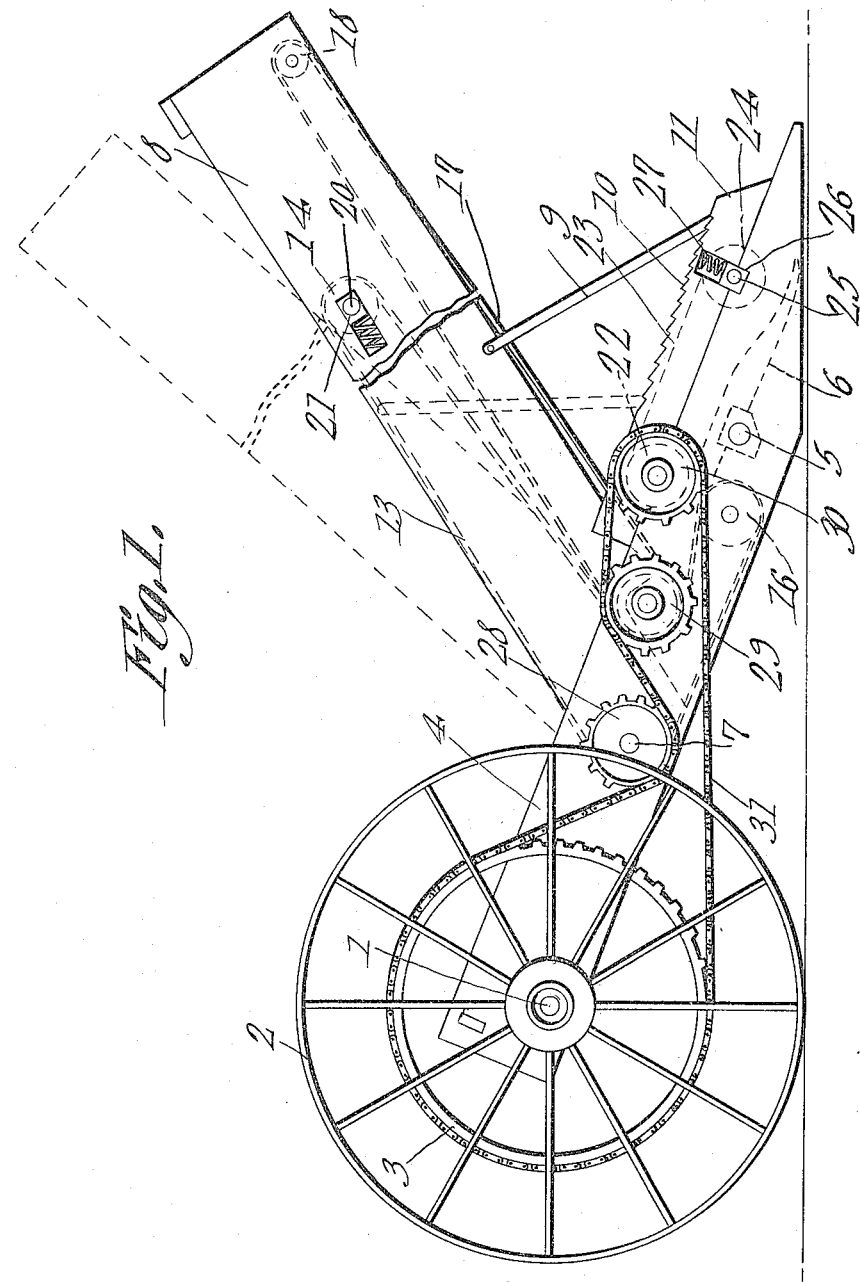

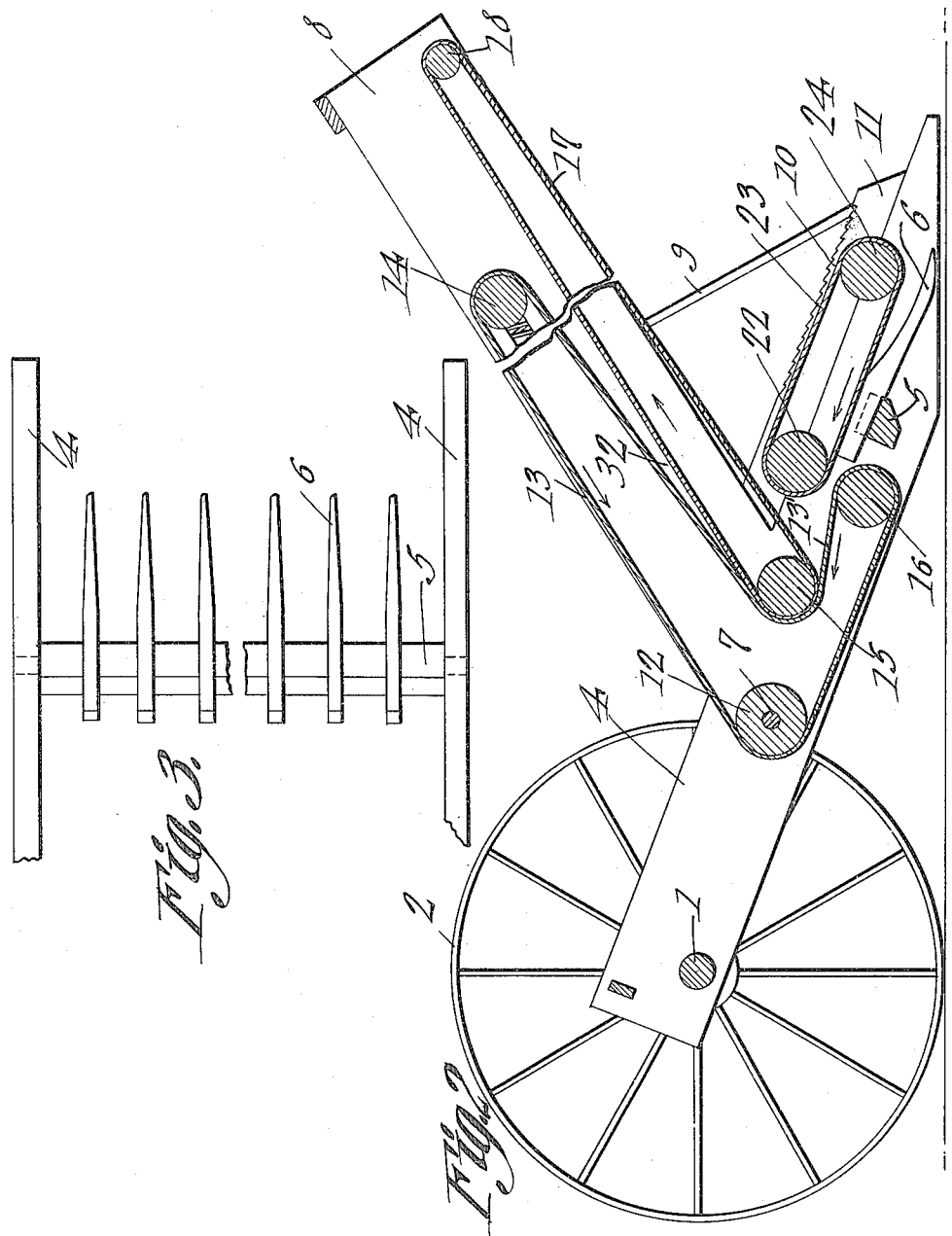

JOHN C. McCOY, OF LA BELLE, MISSOURI.

HAY-LOADER.

1,128,017.  Specification of Letters Patent.  Patented Feb. 9, 1915.

Application filed February 28, 1914. Serial No. 821,775.

*To all whom it may concern:*

Be it known that I, JOHN C. McCOY, a citizen of the United States, residing at La Belle, in the county of Lewis and State of Missouri, have invented a new and useful Hay-Loader, of which the following is a specification.

This invention relates to hay loaders, one of its objects being to provide a simple and compact structure of this character which will operate to efficiently elevate hay into a wagon to which the loader may be attached, the parts operating easily and being so arranged relative to each other as to hold the hay while it is being elevated so that it will not be scattered by the wind.

With the foregoing and other objects in view, which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—Figure 1 is a side elevation of the hay loader. Fig. 2 is a vertical longitudinal section therethrough. Fig. 3 is a plan view of a portion of the rake or gatherer.

Referring to the figures by characters of reference 1 designates the axle of the machine, the same being supported by wheels 2, one of which has a drive sprocket 3 connected thereto. Side strips 4 are supported at their rear ends by the axle 1 and are inclined downwardly and forwardly so as to bear, at their front ends, upon the ground. A cross bar 5 connects the side strips 4 near the front ends thereof and extending downwardly and forwardly from this bar are rake teeth 6 adapted to travel close to or in contact with the ground.

A shaft 7 is journaled within the side strips 4 and constitutes a support for a frame 8 which is extended upwardly from between the side strips 4 and can be of any desired length. This frame is normally supported in an inclined position by means of braces 9 which are pivotally connected to the sides of the frame and bear within notches 10 formed within bars 11 secured upon the side strips 4. Obviously by providing a structure such as described, the frame 8 can be adjusted angularly to any desired position relative to the side strips 4.

Secured upon the shaft 7 is a roller 12 engaged by an endless apron 13 which extends upwardly to and partly around a roller 14 journaled within the frame 8 near the top thereof. From this roller 14 the apron 13 extends downwardly under a roller 15 journaled between the side strips 4 and close to the lower end of the frame 8. The apron then extends forwardly partly around a roller 16 journaled between the side strips 4 close to the rear ends of the rake teeth 6 thus to form a movable table portion 13. Roller 15 is also engaged by another endless apron 17 which extends upwardly within the frame 8 and partly around a roller 18 journaled within the upper end portion of the frame. The roller 14 may be so mounted as to hold the apron taut in the various positions to which it may be adjusted with the frame 8. This roller 14 has trunnions 20 journaled in spring pressed boxes 21 in the sides of frame 8.

A roller 22 is journaled upon the side strips 4 close to and above the rear ends of the teeth 6 and this roller is engaged by an endless apron 23 which extends over the teeth 6 and partly around a roller 24 journaled between the side strips. This last named roller has trunnions 25 journaled within bearing boxes 26 which are normally pressed downwardly by springs 27.

The roller 12 has a sprocket 28 revoluble therewith and a sprocket 29 rotates with roller 15 while another sprocket 30 rotates with roller 22. An endless chain 31 engages the main drive sprocket 3 and the upper flight of this chain is extended under the sprocket 28 and over the two sprockets 29 and 30.

In using the hay loader, the same is designed to be coupled to the back end of a wagon so as to be drawn along the ground behind the wagon. During this movement of the loader the teeth 6, which travel close to the ground, will collect the hay and direct it upwardly under the endless apron 23. During the forward movement of the hay loader the sprocket 3 is rotated and motion is transmitted therefrom through the chain 31 to the various sprockets and rollers. Apron 23 will be caused to travel in the direction indicated by the arrow in Fig. 2 so that any hay that may be deposited on the teeth 6 will be engaged by the lower flight of the apron and caused to drag along the upper faces of the teeth from which the hay will be directed onto the forwardly extending upper flight of the lower portion of apron 13. As this apron is traveling in the direction indicated by the arrow, it will be apparent that the hay, when deposited thereon, will be carried rearwardly under the roller 15 and between the two endless aprons 13 and 17. The hay will thus pass upwardly through the throat 32 formed between the aprons 13 and 17 and will be discharged from the upper portion of apron 17 and into the wagon body overhung thereby.

Inasmuch as the hay is engaged both above and below by the aprons, it will be seen that there is no danger of the hay being scattered while the wind is blowing. Furthermore by adjusting the frame 8 to different positions relative to the side strips 4, the point of discharge of the load in the wagon body can be varied.

What is claimed is:—

1. A hay loader including front and back upwardly extending endless aprons, said back apron having a forwardly extending lower portion forming a table, a rake in advance of said table, and an endless apron above and bearing downwardly on the rake and overhanging the table and extending close to the upwardly extending front apron, said rake and the apron coöperating to hold gathered material under compression while traveling over the rake and between the front and back aprons.

2. A hay loader including front and back upwardly extending endless aprons, said back apron having a forwardly extending lower portion forming a table, a rake in advance of said table, an endless apron above and bearing downwardly on the rake and overhanging the table and extending close to the upwardly extending front apron, said rake and the apron coöperating to hold gathered material under compression while traveling over the rake and between the front and back aprons, and means for adjusting the upwardly extending aprons angularly relative to the rake, thereby to raise material to desired elevations.

3. A hay loader including front and back upwardly extending endless aprons, said back apron having a forwardly extending lower portion forming a table, a rake in advance of said table, an endless apron above and bearing downwardly on the rake and overhanging the table and extending close to the upwardly extending front apron, said rake and the apron coöperating to hold gathered material under compression while traveling over the rake and between the front and back aprons, means for adjusting the upwardly extending aprons angularly relative to the rake, thereby to raise material to desired elevations, and means for actuating the aprons irrespective of said adjustment.

In testimony that I claim the foregoing as my own, I have hereto affixed my signature in the presence of two witnesses.

JOHN C. McCOY.

Witnesses:
H. S. SMITH,
GEO. A. SCOGGIN.

Copies of this patent may be obtained for five cents each, by addressing the "Commissioner of Patents, Washington, D. C."